United States Patent
Lecuna Aguerrevere

(10) Patent No.: US 9,039,307 B2
(45) Date of Patent: May 26, 2015

(54) HOLDING DEVICE FOR A CAMERA

(76) Inventor: Alejandro Lecuna Aguerrevere, Berlin (DE)

( * ) Notice: Subject to any disclaimer, the term of this patent is extended or adjusted under 35 U.S.C. 154(b) by 55 days.

(21) Appl. No.: 14/118,797

(22) PCT Filed: May 21, 2012

(86) PCT No.: PCT/EP2012/059410
§ 371 (c)(1),
(2), (4) Date: Nov. 19, 2013

(87) PCT Pub. No.: WO2012/156536
PCT Pub. Date: Nov. 22, 2012

(65) Prior Publication Data
US 2014/0093229 A1    Apr. 3, 2014

(30) Foreign Application Priority Data
May 19, 2011   (DE) .......................... 10 2011 050 500

(51) Int. Cl.
| | | |
|---|---|---|
| *G03B 17/56* | (2006.01) | |
| *F16M 11/04* | (2006.01) | |
| *F16M 11/08* | (2006.01) | |
| *F16M 11/20* | (2006.01) | |
| *F16M 13/04* | (2006.01) | |

(52) U.S. Cl.
CPC ........... *G03B 17/561* (2013.01); *F16M 11/048* (2013.01); *F16M 11/08* (2013.01); *F16M 11/2092* (2013.01); *F16M 13/04* (2013.01); *G03B 17/563* (2013.01)

(58) Field of Classification Search
CPC .. G03B 17/561; G03B 17/563; F16M 11/048; F16M 11/08; F16M 11/2092; F16M 13/04
USPC .................................................. 396/420–425
See application file for complete search history.

(56) References Cited

U.S. PATENT DOCUMENTS

| | | | | |
|---|---|---|---|---|
| 1,907,439 | A * | 5/1933 | Nopper .......................... | 352/242 |
| 2,357,377 | A * | 9/1944 | Bausch .......................... | 359/409 |
| 2,651,981 | A * | 9/1953 | Calhoun ........................ | 396/420 |
| 2,952,200 | A * | 9/1960 | Welch ............................ | 224/623 |
| 3,330,193 | A * | 7/1967 | Kaess ............................ | 396/14 |
| 5,332,136 | A * | 7/1994 | Rudolph ........................ | 224/185 |
| 5,806,734 | A * | 9/1998 | Scott ............................. | 224/265 |
| 2007/0236662 | A1 * | 10/2007 | Waldorf et al. ............... | 351/206 |

\* cited by examiner

*Primary Examiner* — W B Perkey

(57) ABSTRACT

The invention pertains to a device which allows a person to hold a camera with a first arm (10) which extends longitudinally in the first extension direction (E). The first arm (10) is designed to be attached to or detached from the camera (2) and features a first free end (100) and a chin rest surface (21) provided on that first free end (100). The chin rest surface (21) is designed to rest on the chin (K) of the person (P) holding the camera (2). A second arm (30) extends from the first arm (10) along the second extension direction (E') and features a free end (31) where a grip area (32) is provided. This grip area (32) is designed to allow a person (P) to grasp the camera with one hand (H) using the device (1) and is kept separate from the chin rest surface (21) along the first extension direction (E).

23 Claims, 5 Drawing Sheets

HOLDING DEVICE FOR A CAMERA

Figure 1:
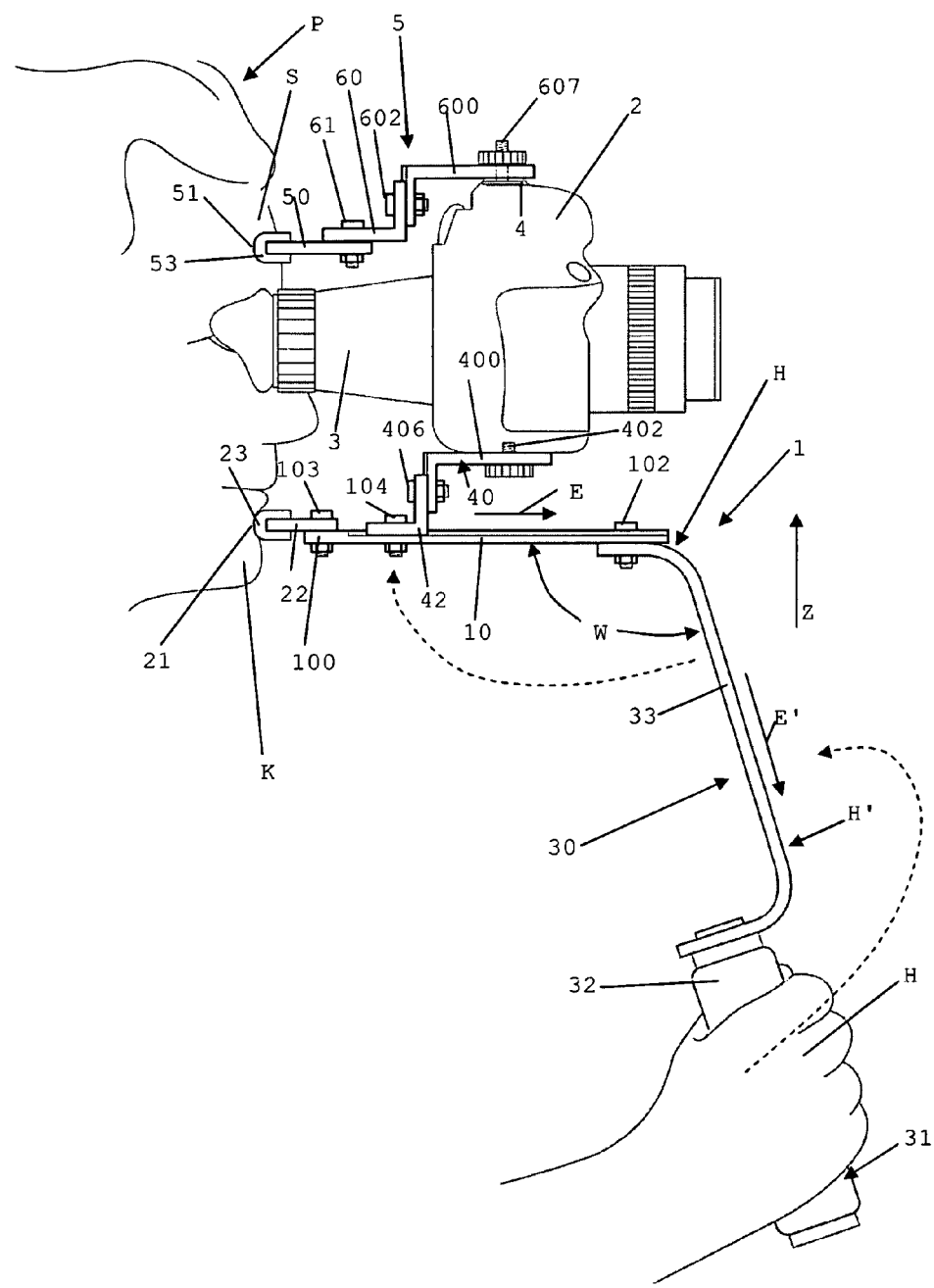

The invention concerns a device which allows a person to hold a camera in accordance with the generic claim 1.

This device displays a first arm, which extends longitudinally along a first extension direction and is designed for connection to the camera to hold the camera in a way that allows it to be detached, whereby the first arm displays a first free end intended for a chin rest surface, resp. a chin rest element with a chin rest surface that is intended and adjusted for contact with the chin of the person holding the camera as per intended use, as well as a second arm extending from the first arm along the length of a second extension direction.

A similar device is known from U.S. Pat. No. 2,952,200. A disadvantage of this device is, in particular, its relative inflexible handling, as it includes an additional support for an arm via a harness to be worn by the user, as well as having to be held in an unfavorable position below the chin.

On this basis, this invention approaches the problem of creating a camera holding device that is easy to use and flexible, while enabling steady camera work and ensuring that the photographed or filmed images, especially while moving (turning), are not blurred.

This problem is solved with a device exhibiting the features of claim 1.

This provides for a grip area or grip on the free end of the second arm, which is intended and adjusted for gripping by the hand of the person using the camera as per intended use, whereby this grip is distanced from the chin rest surface along the length of the first extension direction, and therefore, in particular, is not positioned in a vertical direction immediately below the chin rest surface.

This facilitates the camera being held at three hold points that form a stabilizing tripod. The first hold point is formed by the chin rest surface being pressed against the chin of a person; the second hold point is formed by the grip area being encompassed by one hand; the third hold point is formed by the other hand supporting the camera, resp. the body of the camera, or the camera lens.

Because of the high relative weight of the human head, the chin rest surface has sufficient inertia compared to customary (digital) compact cameras (e.g. in the form of a digital reflex camera) to stabilize resp. steady a hand-held camera. The invention therefore facilitates the steady handling and adjustment of smaller cameras with a simple and flexibly attachable device for generating blur-free images and films. The first extension direction along which the first arm or the device that supports the camera extends, is preferably positioned parallel to the camera's optical axis.

The second arm extends preferably from an area opposite the first free end of the first arm along the first extension direction (e.g. second free end or end area) of the first arm. In preference, the first extension direction connects with the second extension direction, along which the second arm extends longitudinally, at an angle greater or equal to 90°, whereby the direction of, in particular, the second arm, including the grip area, is away from the first arm and away from the body of the person holding the device as per intended use (at an angle greater than 90°). This means that this angle is formed by one side of the second arm facing the person holding the device as per intended use, with a (downward facing) underside of the first arm.

Furthermore, the second arm preferably has a section that extends longitudinally along the second extension direction, which allows the grip area to be positioned preferably along a vertical line at the level of the person's stomach and/or thorax when the chin rest surface is held against the chin of a standing person as per intended use, whereby the grip area is preferably approximately the length of a lower arm away from the person holding the device. The device thus allows the grip area of the device to be held steadily, with the forearm of the person approximately at a right angle.

To adjust the device according to the invention to different conditions and body sizes, it is preferable to attach the second arm in a way that allows it to glide (smoothly) from an initial position longitudinally along the first extension direction to a different second position, e.g. from the first free end of the area opposite the first arm (e.g. second free end of the first arm) toward the middle of the first arm, whereby particularly the second arm is detachably affixed to its respective position on the first arm.

For this purpose, to allow the second arm to be adjusted longitudinally along the first extension direction to different positions, the first arm exhibits a slot that runs in the extension direction and along which the second arm can be glided the length of the first arm, whereby the second arm can be adjustably locked in its respective position on the first arm, preferably by means of a screw that passes through the slot in the first arm and a hole in the second arm. After loosening the screw (e.g. by unscrewing an appropriate nut) it is then possible to slide the second arm along the first arm. In addition, especially if the second arm is in a non-locked (fixed) state in relation to the first arm, e.g. with loosened screw, it can be rotated around a pivot that is vertical to the initial direction in relation to the first arm.

Said chin rest surface in the vicinity of the first free end of the first arm is preferably concave to better accommodate the shape of the human chin, whereby the chin rest surface should be formed on a chin rest element, in particular, in the form of an appropriately padded surface on the chin rest element. For adjustment to the person using the device according to the invention, the chin rest element is preferably detachably affixed to the first arm, in particular at the first free end of the first arm, in particular via a screw that is preferably inserted through a hole in the chin rest element and an aligned hole in the first arm, so that—when the screw is loosened accordingly—the chin rest element can be rotated around a pivot that is vertical to the initial direction in relation to the first arm. The chin rest element resp. the chin rest surface can of course also be attached to the first arm as a single unit.

To (detachably) affix the camera to the first arm of the device, the device preferably also has a camera holder, which is preferably adjustably affixed along the first extension direction of the first arm in such a way that the camera holder (when it is not locked onto the first arm) can glide (smoothly) longitudinally along the first extension direction from an initial position to a different second position, whereby the camera holder, in particular, can be locked at the respective position on the first arm, i.e., detachably affixed to the first arm. To this end, the camera holder can be locked, resp. detachably locked in the respective position on the first arm preferably by means of a screw, which is inserted through the slot in the first arm.

Furthermore, to guide the second arm longitudinally along the first arm (next to said slot) during adjustment movements, there is a first guide that has a corresponding slot in the first arm, whereby the camera holder has an appropriate first groove into which this first guide area of the first arm fits allowing the camera holder to be guided toward or through the guide area when it is pushed longitudinally along the first extension direction.

The camera holder preferably also features a foot, via which the camera holder can be longitudinally adjusted along the first extension direction and which is affixed to the first arm, whereby in particular, this first groove of the camera holder into which the first guide area fits is created in this foot.

The foot is preferably angular and correspondingly exhibits a first bracket arm that runs longitudinally along the first extension direction and a vertically extruding second bracket arm, whereby preferably said first groove of the camera holder is formed on the first bracket arm of the foot that can glide along the first arm resp. its guide area.

The camera holder preferably also exhibits a support element that is affixed to the foot and via which the camera is detachably affixed to the camera holder. To allow the support element to be adjusted in a vertical direction to the first extension direction (up or down), the support element is detachably affixed to the foot, allowing it to be horizontally adjusted (smoothly) from an initial position longitudinally along the first extension direction to a different second position when it is not in a locked state.

This facilitates adjustments to the distance between the support element and the first arm crosswise to the first extension direction.

For easy adjustability of the support element with regard to the foot, there is preferably a first slot on the support element that runs vertical to the first extension direction, whereby the support element can be locked at the respective position on the foot (can be detachably affixed there) preferably by means of a screw that passes through the first slot. Furthermore, there is preferably a second guide on the support element for guiding the second element vertically to the first extension direction along the foot, whereby the second guide exhibits a second guide area that runs vertically to the first extension direction and in which the first slot is formed, which fits into a second groove in the second bracket arm of the foot, so that the second element can glide through this second groove when it is pushed crosswise to the first extension direction.

The support element preferably also has an angular shape that exhibits a corresponding first bracket arm perpendicular to the first extension direction, in which the first slot is formed vertically to the first extension direction and from which a second bracket arm protrudes longitudinally along the first extension direction. The second guide area is preferably formed on the first bracket arm of the support element.

To detachably affix the camera to the second bracket arm of the support element, there is preferably a second slot on the second bracket arm that runs longitudinally along the first extension direction and through which a screw is guided that has a corresponding thread allowing it to be screwed into the base of the camera. When the screw is loosened, the camera can be pushed (smoothly) longitudinally along the second bracket arm, whereby the screw resp. the camera that is connected via the screw, is inserted through the second slot of the support element.

According to a further version of the invention, a camera being held by device according to the invention is given additional stability through the provision of a forehead rest unit, which is intended and adjusted for connection via the camera to the first arm of the device.

The forehead rest unit exhibits a forehead rest surface, which is intended and adjusted for the forehead of the person holding the camera to rest against. The provision of a forehead rest unit therefore provides a fourth holding point for the camera.

The forehead rest unit is preferably designed to serve the purpose of detachably affixing a hot shoe of the kind normally provided with the camera.

Said forehead rest surface is preferably formed on a forehead rest element of the forehead rest unit, and is, in particular, in the form of a (concave) surface of a cushioned pad on the forehead rest element.

To allow the forehead rest element to be adjusted to the particular conditions, resp. the person using the device, the forehead rest element is preferably detachably affixed in a manner, in particular via a screw, that—when loosened—allows the forehead rest element to be rotated around a pivot, which is vertical to the first extension direction opposite the base.

The base of the forehead rest element is preferably angular and hence exhibits a first bracket arm and a vertically extruding second bracket arm.

Along the first bracket arm of the base, the forehead rest element is preferably adjustable affixed onto said first bracket arm in such a way that the forehead rest element can be adjusted (smoothly) from an initial position longitudinally along said first bracket arm of the base to a different second position.

The first forehead rest element can preferably be looked (detachable fixed) in the respective position on the first bracket arm of the base.

To adjust the forehead rest element, in particular along the first bracket arm of the base, on the first bracket arm of the base there is preferably a slot along the extent of the first bracket arm, via which the forehead rest element can be affixed to the first bracket arm of the base by means of a screw inserted through a hole in the forehead rest element and said slot. The hole in the forehead rest element can also (or instead of the slot in the first bracket arm of the base) be in the form of a slot.

On the base of the forehead rest element, the forehead rest unit also preferably exhibits a holding element designed to be detachably affixed to the hot shoe of the camera.

To adjust the forehead rest unit, in particular, to the head size of the person using the device, the holding element of the forehead rest unit is adjustably affixed, preferably vertically to the first extension direction, to the base of the forehead rest unit so that the holding element can be moved vertically from an initial position along the first extension direction to a different second position.

Whereby the holding element can preferably be locked (detachably affixed) at the respective position on the base.

Furthermore, to adjust the holding element vertically to the first extension direction, there is preferably an extended first slot in the holding element vertical to the first extension direction.

To lock the holding element to the base, a screw is preferably inserted through a hole in the base and through said first slot, so that the holding element is detachably affixed at the respective position on the base.

To guide adjustment movements, there is also preferably a third guide, which exhibits a third guide area positioned crosswise to the first extension direction and in which the first slot is formed, whereby the second bracket arm of the base exhibits a groove in which the third guide area of the holding element of the forehead rest unit fits so that the holding element is guided through said groove when it is pushed crosswise to the first extension direction.

The holding element is preferably also angular and exhibits, vertical to the first extension direction, an extended first bracket arm, via which the holding element is affixed to the base i.e. the first slot and the third guide area are provided on this first bracket arm, as well as a vertically extruding second bracket arm.

And finally, on the second bracket arm and extending along said bracket arm, a second slot is preferably provided for detachably affixing the holding element onto the hot shoe of the camera by means of a screw through the slot, whereby said screw exhibits a rectangular head, preferably on a free end, to engage behind the hot shoe.

Furthermore, to facilitate the compact storage or transportation of the device according to the invention, a first hinge (joint) is preferably provided on the second arm so that the second arm can be rotated toward the first arm (can be folded onto the first arm) so that, in particular, both members run parallel to each other.

In addition, a second hinge (joint) is preferably provided on the second arm, so that the grip area can be rotated toward a longitudinally extended element of the second arm (can be folded onto it), via which the grip area is connected to the first arm so that the grip area and the extended element of the second arm, in particular, are approximately parallel to each other.

In accordance with a further version of the invention, it is intended that the first arm consists of two parallel tubular elements, which run longitudinally along the first extension direction.

To this end, the camera holder is preferably adjustably affixed to the two tubular elements.

Each of the two tubular elements also exhibits a first end area and, opposite the first extension direction, a second end area, whereby the first end areas are connected to each other via a first fastener, and the second end areas are connected to each other via a second fastener, whereby both fasteners preferably encompass the designated end areas of the respective tubular elements.

It is also preferable that said chin rest element is affixed to the first fastener, whereas the second arm is affixed to the second fastener, in such a way that said angle between the second and the first arm, resp. the two tubular elements, can be adjusted.

In accordance with a further aspect of the invention, the second fastener for adjusting the second arm along the first extension direction is detachably affixed to the two tubular elements, so that—in a loosened state—it can be pushed along the tubular elements.

In a further version of the invention it is intended to provide the device with a third member, which protrudes from one of the first free ends of the first arm along the free end area of the first arm opposite the first extension direction (the second arm protrudes from the first arm between the first free end and said third member). The third member preferably has a counterweight at one of the free ends of the third member. If the device has a third arm, the second arm protrudes vertically from the first arm. The third arm preferably forms an angle with the first arm that is greater or equal 90°.

In accordance with a further version of the invention, the camera holder is designed to accommodate a camera in the form of a cell phone, smartphone (e.g. iPhone) and/or tablet pc, in that the camera holder is designed to grip two opposite sides of the camera.

And finally, in accordance with a further aspect of the invention, the chin rest surfaces of all versions can be designed to support the chin of the person holding the camera (in particular, without gaps), either from the front or from below.

Further features and advantages of the invention are described by means of the following description of the figures showing examples of the various possibilities of use.

Figure 2:
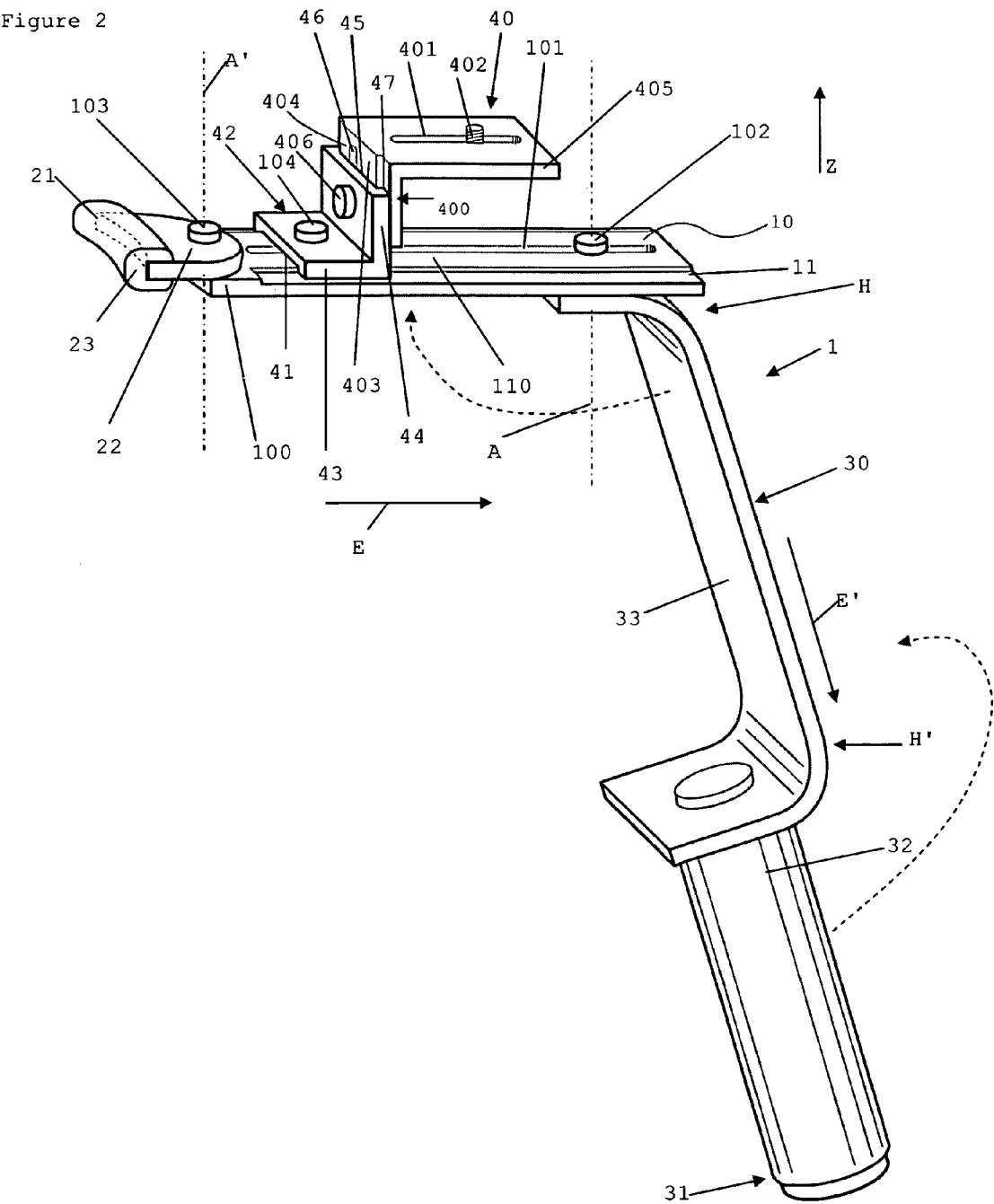
Figure 3:
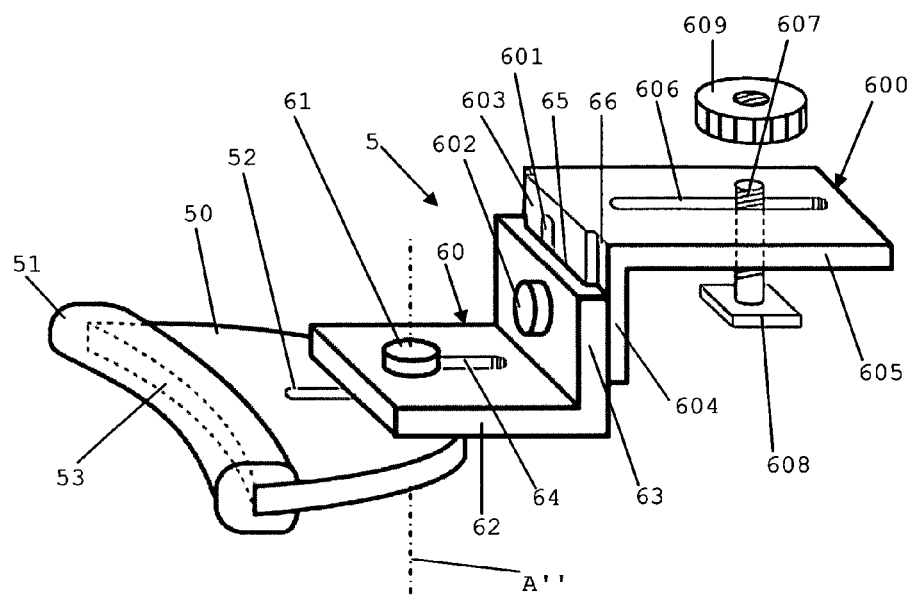
Figure 4:
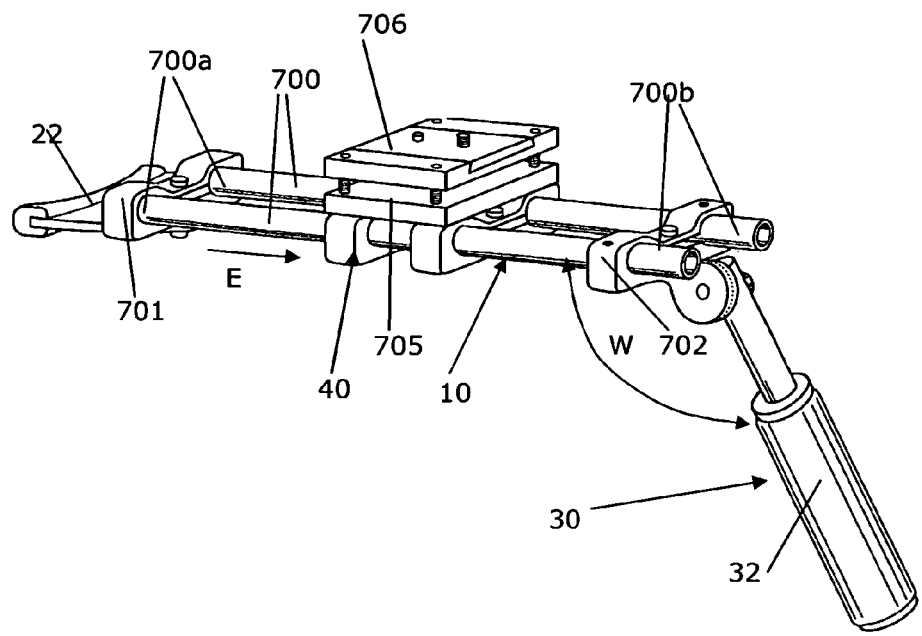
Figure 5:
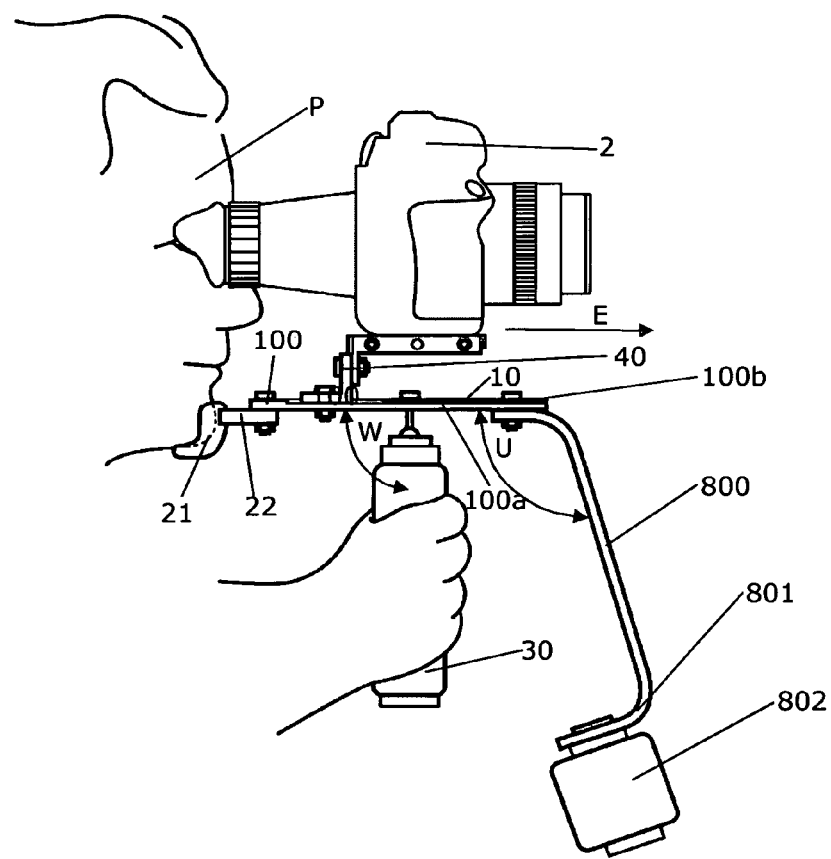
Figure 6:
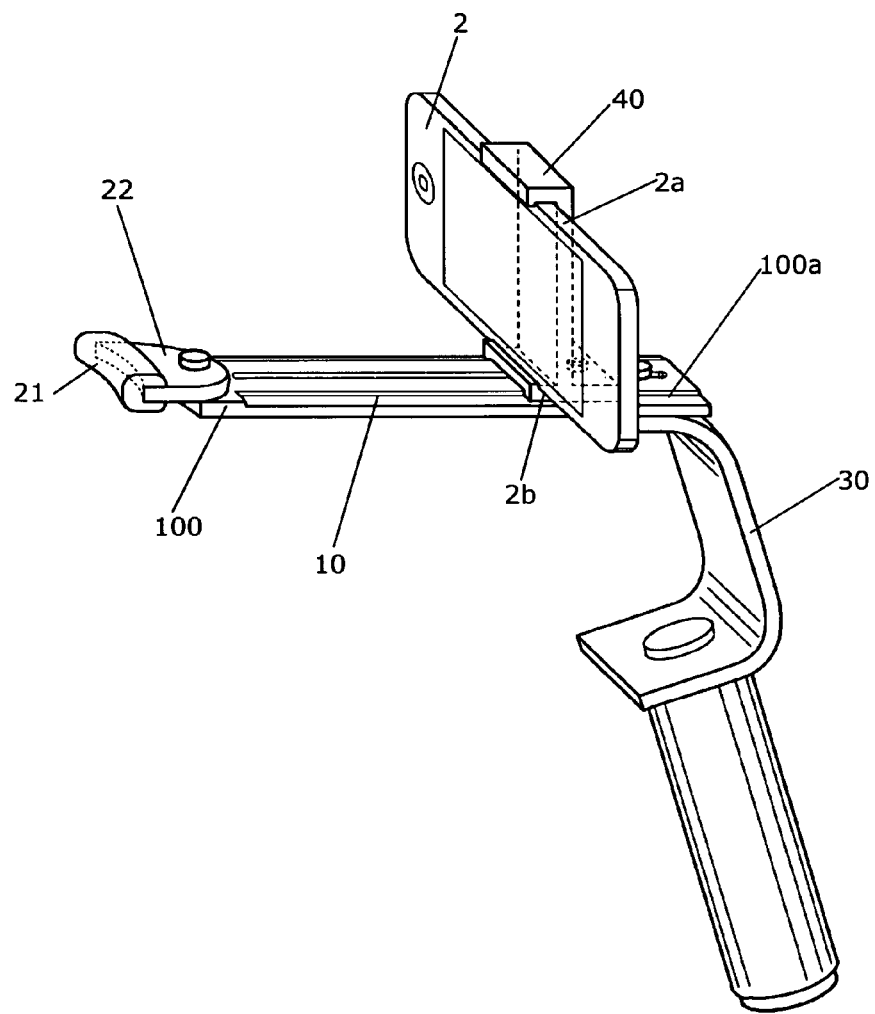

Shown are:

FIG. 1 schematic profile of a device according to the invention being used by person to hold a camera with optional forehead rest unit, FIG. 2 perspective view of a device according to the invention for holding a camera by a person, FIG. 3 perspsective view of an optional forehead rest unit for the device according to the invention, FIG. 4 perspective view of a further version of the invention, FIG. 5 side view of a further version of the invention and FIG. 6 a version of the camera holder for supporting a smartphone or similar device.

FIG. 1, in connection with FIGS. 2 and 3, shows a device according to the invention 1 intended for the purpose of holding a camera 2. At the front, the camera exhibits an eyepiece tube 3 that abuts the edge of the display of the camera 2 at its first circumferential free end, whereby a second circumferential free end on the opposite side of the eyepiece tube forms an area for the eye area of the person P using the device according to the invention as per intended use, allowing the Person P to see the camera display through said eyepiece tube 3. Such eyepiece tube 3 can also be referred to as a display magnifier or viewfinder or eye part.

The device 1 serves in accordance with FIG. 1 to hold the camera 2 with an arm that is effectively bent at a right-angle.

The device 1 exhibits an extended rectangular arm 10 for holding the camera 2 along a first extension direction E and preferably made of aluminum, with a first free end 100 on which a chin rest element 22 is provided and affixed in particular, by means of a screw 103 that joins the chin rest element to the first arm 10 via the aligned holes. In this way, by loosening the nut assigned to the screw 103, the chin rest element 22 can be rotated around an axis A' that is vertical to the first extension direction E.

The chin rest element 22 serves to lean the device 1 against the chin K (also from below) of a person P holding the device as per intended use to stabilize the camera 2 being held by means of the device 1 so that the camera 2 does not wobble during photographing or filming and the controlled guidance and pivoting of the camera 2 by means of the device 1 is possible.

To lean the chin rest element 22 against the chin K of the person P, one free end of the chin rest element 22 exhibits a cushioned pad 23 with a concave chin rest surface. The chin rest element 22 is also made of aluminum (except for the cushioned pad 23).

A second arm 30 extends along a second extension direction E' from a second free end opposite the first free end 100 resp. area 100a of the first arm 10 at an angle greater or equal 90°, so that the second arm 30 runs vertical to the first arm 10 (90°) resp. away from the person P (W greater or equal 90°), whereby the second arm 30 exhibits a circular cylinder-shaped grip 32 intended and adjusted to be held by the hand H of a person using the device 1 as per intended use. The grip area 32 is affixed to the second arm 30 by means of a bent first end area of an element 33 that extends longitudinally along the second extension direction E', whereby said longitudinally extended element 33 of the second arm 30 is affixed to the first arm 10 via a further bent second end area. This requires a screw 102 to be inserted through both the hole in the second end area as well as a slot 101 in the first arm that is formed in the middle of the first arm 10 and extends along one first extension direction E. When the screw 102 is loosened, the second arm 30 can be rotated around an axis A vertical to the first extension direction E opposite the first arm 10. The longitudinal element 33 of the second arm 30 is also preferably made of aluminum.

Furthermore, when screw 102 is loosened, the second arm 30 can, in relation to the first arm 10, be moved or shifted along the first extension direction E from the second end area 100a (first position) towards the middle of the second arm 30 (second position). The screw 102 then moves in slot 101. By tightening one of the nuts for screw 102, the second arm 30 can be attached in the respective position on the first arm 10.

To support the camera 2, a camera holder 40, preferably made of aluminum, is provided and features an angled foot 42 as well as an angled support element 400 connected to the foot 42. The camera 2 can be attached to the support element 400.

The foot 42 features a first bracket arm 43 designed to rest on the first arm 10 as well as a second bracket arm 44 which runs perpendicular to the first and upon which the support element 400 is attached. On one of the sides facing the first arm 10, the first bracket arm 43 of the foot 42 which extends along the first extension direction E features a first groove 41 which extends along the first extension direction E. A first guide area 110 formed on the first arm 10 engages the groove via the recesses 11 which run along the first extension direction E on both sides of the arm 10 and which can be formed, for example, by milling the first arm 10 in the appropriate manner.

Via screw 104, which is guided through a hole in the first bracket arm 43 and the slot 101 of the first arm 10, the first bracket arm 43 of the foot 42 is now attached on the first arm 10 and can be loosened. Note that when the nut of said screw 104 is loosened the foot 42 can slide on, and be guided by, the first guide area 110 for the purpose of moving the camera holder 40 along the first extension direction E.

To adjust the distance of camera 2 to the first arm 10 perpendicular to the first, extension direction E, the support element 400 is attached to foot 42 and remains adjustable.

To this end the support element 400 features a first bracket arm 404 which runs perpendicular to the first extension direction E and a second guide area 403 which results from the recesses 47 on both sides of the bracket arm 404 and which can be formed, for example, by milling the first bracket arm 404 in the appropriate manner. The second guide area 403 engages a second groove 45 formed on the second bracket arm 44 of the foot 42. This groove extends perpendicular to the first extension direction E so that the support element 400 is guided into the second groove 45 perpendicular to the first extension direction E. To attach the first bracket arm 404 of the support element 400 on the second bracket arm 44 of the foot 42, a first slot 46 of the support element 400 is built into a second guide area 403. This slot is penetrated by a screw 406 which is guided through a hole in the second bracket arm 44 of the foot 42. This allows the support element 400 to be moved perpendicular to the first extension direction E with respect to the foot 42 and is attached in the respective position on the foot via the screw 406.

To attach the camera 2 to support element 400, said element features a second bracket arm 405 which extends from the first bracket arm 404 which, in turn, extends along the first extension direction E, including a second slot 401 formed therein.

Thanks to a matching screw 402 which can be inserted into a thread provided on the camera 2, the camera 2 can now be variably attached to the second bracket arm 405 of the support element 400 along the first extension direction E. This is done by guiding said screw 402 through the second slot 401 of the support element 400 and inserting and tightening it in the threading of camera 2.

The device 1 according to the invention as depicted in FIG. 2 allows the camera 2 to be held using three hold points which form a triangle (hold point on the chin K, on the grip area 32 using one hand H and directly on the housing of camera 2 using the other hand).

As per FIG. 1 in conjunction with FIG. 3, an additional hold point on the forehead S of person P can be created using a forehead rest unit 5.

This unit includes a forehead rest element 50 which has a cushion 53 on the free end which forms a concave forehead rest surface 51 for placement on the forehead S of a person P using the device 1 as intended.

The forehead rest element 50 features an angular base 60 with a first bracket arm 62 and a second bracket arm 63 which runs perpendicular to the first (and perpendicular to the first extension direction E). To attach the forehead rest element 50 onto the first bracket arm 62, a slot 64 is provided to receive a screw 61 which also penetrates a slot 52 on the forehead rest element 50. The forehead rest element can therefore be attached to the first bracket arm 62 of the base 60 with a compatible nut. When the nut is loosened the forehead rest element 50 can be swiveled around axis A", which runs perpendicular to the first extension direction E with respect to the base 60.

The base 60 can be attached to a hot shoe 4 of the camera 2 using a holding element 600 which also has an angular design. The entire forehead rest element 5 can thus be attached to the first arm 10 of the device 1 via the camera 2. A direct connection to the first arm 10 is not necessary. To adjust the height of the forehead rest element 50, a third guide area 603 is provided on the first bracket arm 604 of the holding element 600 that extends along the second bracket arm 63 of the base 60. This guide area includes the first slot 601 that runs along the first bracket arm 604 of the holding element 600 and engages a groove 65 on the second bracket arm 63 of base 60 so that the holding element 600 is guided into groove 65 perpendicular to the first extension direction E when making adjustments. The third guide area 603 is in turn formed by the bilateral recesses (millings) 66 on the first bracket arm 604 of the holding element 600.

To now attach the holding element 600 in the respective (set) position on the base 60, a screw 602 is inserted through a hole in the second bracket arm 62 of the base 60 and the first slot 601 of the holding element 600 and can then be tightened in place using a compatible nut.

The holding element 600 on the hot shoe 4 of the camera 3 is finally attached via a second bracket arm 605 that runs perpendicular from the first bracket 604 of the holding element 600. For this purpose a second slot 606 is provided on the second bracket arm 605 of the holding element 600. This slot receives a screw 607 which engages behind the hot shoe 4 via a rectangle head 608. By tightening the screw 607 using a manually operated nut 609, the head 608 of the screw 607 and the second bracket arm 605 of the holding element 600 are pulled against the hot shoe 4 on both sides. Due to the second slot 606, the second bracket arm 605 can be attached to the camera 2 in a variable manner.

To ensure that the device according to the invention can be transported and stored in the most compact form possible, a first hinge (joint) H can be provided on the second arm 30 as a preferred option so that the second arm 30 can swivel along the dotted arrow on the first arm 10 (can be folded up on the first arm 10) and so that, in particular, both arms 10, 30 run largely parallel to each other when folded up together.

Given the aforementioned reason, a second hinge (joint) H' can furthermore be provided on the second arm 30 so that the grip area 32 can pivot along the dotted arrow on the extended element 33 of the second arm 30 (can be folded onto this element) and so that, in particular, the grip area 32 and the extended element 33 of the second arm 30 run largely parallel to each other when folded up together.

FIG. 4 shows a modification of the embodiment depicted in FIG. 1 in which the first arm 10 features two extended tubular elements 700 which run parallel to each other in the first extension direction E and upon which the camera holder 40 (adjustable) is attached. Each of these elements features a first end section 700a (on the chin rest element 22) and a second end section 700b on the opposite side in the first extension direction E. The first end sections 700a are connected via a first fastener 701 and the second end sections 700b via a second fastener 702. Of particular note, both fasteners 701, 702 nave recesses for inserting the matching end sections 700a, 700b of the tubular elements 700. The chin rest element 22 is attached to the first fastener 701 while the second arm 30 is attached to the second fastener 702 in such a way that the angle W between the first arm 10 and the second arm 30 can be adjusted. Furthermore, the second fastener 702 is detachably attached to the two tubular elements 700 so that the second arm 30 can be adjusted along the first extension direction E.

The movable camera holder 40 attached to the first arm 10 can feature two parallel superimposed plates 705, 706. The camera 2 is attached on the top plate 706 which is height-adjustable in relation to the bottom plate 705 (e.g. via screws).

FIG. 5 shows another modification of the embodiment depicted in FIG. 1 in which a third arm 800 is added which extends along the first extension direction E from one of the first free ends 100 of the first arm 10 to the free end section 100b of the first arm 10. Preferably, the angle U formed between the third arm 800 and the first arm 10 is greater than or equal to 90°. The third arm 800 also features a counterweight 802 on the free end section 801 of the third arm 800.

Finally, according to the embodiment depicted in FIG. 5, the second arm 30 extends from the first arm 10, preferably in a perpendicular fashion (W=90°).

FIG. 5 also shows a generally viable configuration of the chin rest surface 21 of the chin rest element 22. Based on this configuration, the chin rest surface 21 is reshaped to fit the chin of person P, which means the chin can be placed on the surface either from the front or from below.

Finally, FIG. 6 shows another possible configuration of the camera holder 40 which allows the attachment of a camera 2 in the form of a smartphone (e.g. an iPhone). The camera holder 40 is designed to clamp down on two opposite edges 2a, 2b of the camera 2. The camera holder 40 encloses the camera 2, preferably in the cross-section.

The invention claimed is:

1. Device that allows a person to hold a camera with:
a first arm (10) longitudinally extended in the first extension direction (E) which is designed to attach or detach the camera (2) and features a first free end section (100),
a chin rest surface (21) provided on the first free end (100) of the first arm (10) and designed to be placed on the chin (K) of the person (P) holding the camera (2),
a second arm (30) extending from the first arm (10) in the second extension direction (E'),
characterized by
the addition of a grip area (32) on the free end (31) of the second arm (30) which is designed to be grasped by a person (P) with one hand for the purpose of holding the camera (2) with the device (1) and whereby the space between the grip area (32) and the chin rest surface (21) is maintained along the first extension direction (E).

2. Device according to claim 1, characterized by the second arm (30) extending from one of the first free ends (100) to the opposite area (100a) of the first arm (10) along the 25 first extension direction (E).

3. Device according to claim 1 or 2, characterized by the second arm (30) forming an angle (W) with the first arm (10) greater than or equal to 90° and whereby the side (30a) of the second arm (30) facing the person (P) holding 30 the device (1) as intended includes this angle (W) with the bottom (10a) of the first arm (10).

4. Device according to claim 1, characterized by the second arm (30) having a length along the second extension direction (E') such that the grip area (32) remains at the height of the stomach and/or thorax of the person (P) whose chin is vertically placed (Z) on the chin rest surface (21) in the intended manner.

5. Device according to claim 1, characterized by having the second arm (30) in the first extension direction (E) attached to the first arm (10) in an adjustable manner so that the second arm (30) can be adjusted from a first position along the first extension direction (E) to a second position different from the first and whereby the second arm (30) can then be locked in the respective position on the first arm (10).

6. Device according to claim 1, characterized by the first arm (10) featuring a slot (101) which extends along the first extension direction (E) for the purpose of adjusting the second arm (30) along the first extension direction (E).

7. Device according to claim 6, characterized by the capacity to lock the second arm (30) in the respective position on the first arm (10) by means of a screw (102) inserted through the slot (101) on the first arm (10).

8. Device according to claim 1, characterized by the capacity to swivel the second arm (30) around a pivot axis (A) which runs perpendicular to the first extension direction (E) with respect to the first arm (10) when the second arm (30) is not locked on the first arm (10).

9. Device according to claim 1, characterized by the addition of a chin rest surface (21) to the chin rest element (22), whereby the chin rest element (22) can be attached to or detached from the first arm (10) via a screw (103) and can also swivel around a pivot axis (A') which runs perpendicular to the first extension direction E) with respect to the first arm (10).

10. Device according to claim 1 characterized by the inclusion of a camera holder (40) that can be used to attach or detach the camera (2) on the first arm (10).

11. Device according to claim 1, characterized by the ability to adjust the camera holder (40) attached to the first arm (10) in the first extension direction (E) so that the camera holder (40) can be adjusted from a first position along the first extension direction (E) to a second position different from the first and whereby the camera holder (40) can also be locked in the respective position on the first arm (10).

12. Device according to claim 11, characterized by the ability to lock the camera holder (40) in the respective position on the first arm (10) by means of a screw inserted through the slot (101) on the first arm (10).

13. Device according to claim 1, characterized by the addition of a guide on the first arm (10) for the purpose of guiding the camera holder (40) in the first extension direction (E), whereby the first guide features a first guide area (110) which runs in the first extension direction (E) and the camera holder (40) features a first groove (41) which engages the first guide area (110) of the first arm (10), whereby the camera holder (40) includes a foot (42) which is used to attach the camera holder (40) on the first arm (110) and adjust it along the first extension direction (E), whereby the first groove (41) of the camera holder (40) is provided on the foot (42) which has an angular design and features a first bracket arm (43) which runs in the first extension direction (E) and a second bracket arm (44) which runs perpendicular to the first, whereby the aforementioned first groove (41) of the camera holder is provided on the first bracket arm (43) of the foot (42) and the camera holder (40) features a support element (400) which is attached to the foot (42) and designed to be connected with or removed from the camera (2), whereby the support element (400) is attached to the foot (42) and can be adjusted perpendicular to the first extension direction so that the support element (400) can be adjusted from a first position perpendicular to the first extension direction (E) to a second position different from the first, whereby the support element (400) can be locked in the respective position on the foot (42) and also features a first slot (46) which extends perpendicular to the first extension direction for the purpose of adjusting the support element (400) perpendicular to the first extension direction (E), whereby the support element (400) can be locked in the respective position on the foot (42) via a screw (406) inserted through the first slot (46) of the support element (400), whereby a second guide is provided on the support element (400) for the purpose of guiding the support element (400) perpendicular to the first extension direction (E), whereby the second guide features a second guide area (403) which runs perpendicular to the first extension direction (E), whereby the second bracket arm (44) of the foot (43) features a second groove (45) which engages the second guide area (403) of the first support 15 element (400), whereby the support element (400) has an angular design and features a first bracket arm (404) running perpendicular to the first extension direction (E) and a second bracket (405) running in the first extension direction (E), whereby the second guide area (403) is provided on the first bracket arm (404) of the support element (400) while a second slot (401) running in the first extension direction (E) is provided on the second bracket arm (405) of the support element for the purpose of attaching or detaching the camera (2) on the support 25 element (400) by means of a screw (402) inserted into the slot (401).

14. Device according to claim 1, characterized by the device (1) featuring a forehead rest element (5) with a forehead rest surface (51) which is designed to rest on the forehead (S) of the person (P) holding the camera (2) while the forehead rest element is designed to be attached or detached on a hot shoe (4) of the camera (2).

15. Device according to claim 14, characterized by having the forehead rest surface (51) placed on a forehead rest 35 element (50) of the forehead rest unit (5), whereby the forehead rest element (50) can be attached or detached on a base of the forehead rest unit (E) by means of a screw (61), whereby the forehead rest element (50) can be swiveled around a pivot axis (A'') which is aligned perpendicular to the first extension direction (E) with respect to the base (60), whereby the base (60) has an angular design and features a first bracket arm (62) and a second bracket arm (63) which runs perpendicular to the first, whereby the forehead rest element (50) is attached to the first bracket arm (62) and can be adjusted along the first bracket arm of the base so that the forehead rest element (60) can be adjusted from a first position along the aforementioned bracket arm (62) of the base (60) to a second position different from the first, whereby the forehead rest element (50) can be locked in the respective position on the first bracket arm (62) of the base (60), whereby for the purpose of adjusting the forehead rest element (50) the first bracket arm (62) and/or the forehead rest element (50) features a slot (64, 52) which is penetrated by a screw (61) for attaching the forehead rest element on the first bracket arm (62) of the base (60), whereby the forehead rest element (5) features a holding element which is attached to the base (60) of the forehead rest unit (5) and is designed to be attached or detached on the hot shoe (4) of the camera (2), whereby the holding element (600) of the forehead rest unit (5) is attached to the base (60) of the forehead rest unit (5) and can be adjusted perpendicular to the first extension direction (E) so that the holding element (600) can be adjusted from a first position perpendicular to the first extension direction to a second position different from the first, whereby the holding element (600) can be locked in the respective position on the base (60) and whereby the holding element (600) features a first slot which runs perpendicular to the first extension direction (E) for the purpose of adjusting the holding element perpendicular to the first extension direction (E) and whereby the holding element (600) of the forehead rest unit (5) can be locked in the respective position on the base (60) by means of a screw inserted through the first slot (601), whereby the third guide is provided on the holding element (600) of the forehead rest unit (5) for the purpose of guiding the holding element (600) of the forehead rest unit (5) perpendicular to the first extension direction (E), whereby the third guide features a third guide area which runs perpendicular to the first extension direction (E), whereby the second bracket arm (63) of the base (60) features a groove (65) which engages the third guide area (603) of the holding element (600) of the forehead rest unit (5), whereby the holding element (600) of the forehead rest element (5) has an angular design with a first bracket arm (604) running perpendicular to the first extension direction (E) and a second bracket arm (605) running perpendicular to the first, whereby the third guide area (603) on the first bracket arm (604) is attached to the first bracket arm (604) of the holding elements (600), whereby a second slot (606) which runs parallel to the second bracket arm (605) is provided on the second slot (605) for the purpose of attaching and detaching the holding element (600) on the hot shoe (4) of the camera (2) via a screw (607) inserted in the second slot (606), whereby said screw (607) features a rectangular head (608) on the free end for the purpose of locking into the hot shoe.

16. Device according to claim 1, characterized by the first arm (10) featuring two longitudinally extended tubular elements (700) which run parallel to each other in the first extension direction (E).

17. Device according to claims 16, characterized by having the camera holder (40) (adjustable) attached to the two tubular elements (700).

18. Device according to claim 16, characterized by the two tubular elements (700) each featuring a first end area 35 (700a) and second end area (700b) on the opposite side running in the first extension direction (E), whereby the first end areas (700a) are connected to each other via a first fastener (701) and the second end areas (700b) via a second fastener (702) and both fasteners (701, 702) enclose the matching end areas (700a, 700b) of the tubular elements (700).

19. Device according to claims 18, characterized by the placement of the chin rest element (22) on the first fastener (701).

20. Device according to claim 18, characterized by the placement of the second arm (30) on the second fastener (702), especially in such a way that the angle (W) can be adjusted, and whereby the second fastener (702) is attached to both tubular elements (700) for the purpose of adjusting the second arm (30) along the first extension direction (E).

21. Device according to claim 1, characterized by the addition of a third arm (800) which runs along the first extension direction (E) from one of the first free ends (100) of the first arm (10) to the free end area (100*b*) of the first arm (10) on the opposite side, whereby the third arm features a counterweight (802) on the free end (801) of the third arm (800) and whereby the second arm (30) extends perpendicular from the first arm (10) while the third arm (800) forms an angle (U) with the first arm greater than or equal to 90°.

22. Device according to claim 10, characterized by a camera holder (40) configured to hold a camera (2) in the form of a cellular phone, smartphone and/or a tablet PC and whereby the camera holder (40) is designed to clamp down on the camera (2), in particular by applying pressure on two opposite edges (2*a*, 2*b*) of the camera (2).

23. Device according to claim 1, characterized by the design of the chin rest surface (21) which allows it to be placed on the chin of the person holding the camera (2) either from the front or from below.

\* \* \* \* \*